(12) United States Patent
Kim (10) Patent No.: US 8,293,410 B2
(45) Date of Patent: *Oct. 23, 2012

(54) SECONDARY BATTERY

(75) Inventor: Cheon Soo Kim, Cheonan-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/411,273

(22) Filed: Mar. 25, 2009

(65) Prior Publication Data

US 2009/0246639 A1 Oct. 1, 2009

Related U.S. Application Data

(63) Continuation of application No. 11/137,136, filed on May 24, 2005.

(30) Foreign Application Priority Data

May 25, 2004 (KR) .................. 10-2004-0037501

(51) Int. Cl.
*H01M 2/16* (2006.01)
*H01M 2/18* (2006.01)

(52) U.S. Cl. ........................ 429/246; 429/142

(58) Field of Classification Search .......... 429/142, 429/144, 246, 251, 322, 231.95, 185, 171, 429/173
See application file for complete search history.

(56) References Cited

U.S. PATENT DOCUMENTS

| | | | |
|---|---|---|---|
| 4,049,882 A * | 9/1977 | Beatty | 429/94 |
| 5,354,629 A * | 10/1994 | Kuroda et al. | 429/94 |
| 5,580,679 A | 12/1996 | Tanaka | |
| 5,880,201 A * | 3/1999 | Enomoto et al. | 524/492 |
| 6,180,285 B1 * | 1/2001 | Yoshida et al. | 429/241 |

(Continued)

FOREIGN PATENT DOCUMENTS

JP  05-101815  4/1993

(Continued)

OTHER PUBLICATIONS

Office action, with English translation, dated Dec. 26, 2005 for corresponding Korean Patent Application No. 10-2004-0037501 listing cited references.

(Continued)

*Primary Examiner* — Jennifer Michener
*Assistant Examiner* — Eli Mekhlin
(74) *Attorney, Agent, or Firm* — Christie, Parker & Hale, LLP (57) ABSTRACT

An electrode assembly for a secondary battery comprising an adiabatic plate attached to the negative electrode plate is disclosed. The electrode assembly comprises a positive electrode plate having a positive electrode collector, a positive electrode coating, and a non-coated area on the positive electrode collector. The negative electrode plate has a negative electrode collector, a negative electrode coating, and a non-coated area on the negative electrode collector. A separator insulates the positive and negative electrode plates. Positive and negative electrode tabs are attached to the non-coated areas of the positive and negative electrode collectors. The negative electrode plate has an adiabatic plate attached to the surface of a non-coated area of the negative electrode collector that is opposite the surface to which the negative electrode tab is attached. This construction improves battery stability and prevents short circuits caused either by heat generated during overcharging or by an internal short circuit.

18 Claims, 9 Drawing Sheets

U.S. PATENT DOCUMENTS

| | | |
|---|---|---|
| 6,251,537 B1 | 6/2001 | Kim et al. |
| 7,033,697 B2 | 4/2006 | Park et al. |
| 7,261,972 B2 | 8/2007 | Inada et al. |
| 7,422,825 B2 | 9/2008 | Inoue et al. |
| 7,482,094 B2 | 1/2009 | Aamodt |
| 2002/0119367 A1* | 8/2002 | Watanabe et al. ............. 429/129 |
| 2003/0099880 A1* | 5/2003 | Park et al. .................... 429/211 |
| 2003/0148185 A1 | 8/2003 | Kusumoto et al. |
| 2003/0232243 A1* | 12/2003 | Hong ........................... 429/161 |
| 2004/0161662 A1* | 8/2004 | Kim et al. ...................... 429/94 |
| 2004/0180259 A1 | 9/2004 | Kim et al. |
| 2005/0058895 A1* | 3/2005 | Aamodt ........................ 429/142 |

FOREIGN PATENT DOCUMENTS

| | | |
|---|---|---|
| JP | 5-190199 | 7/1993 |
| JP | 06-187969 | 7/1994 |
| JP | 09-288996 | 11/1997 |
| JP | 11-307089 | 11/1999 |
| JP | 2000-173657 | 6/2000 |
| JP | 2000-188115 | 7/2000 |
| JP | 2001-155779 | 6/2001 |
| JP | 2003-168417 | 6/2003 |
| WO | WO 97/08762 | 3/1997 |
| WO | WO 2004/012284 A1 | 2/2004 |

OTHER PUBLICATIONS

Patent Abstract of Japan, Publication No. 09-288996, dated Nov. 4, 1997, along with machine translation in English.

Patent Abstract of Japan, Publication No. 2000-173657, dated Jun. 23, 2000, along with machine translation in English.

Patent Abstract of Japan, Publication No. 2000-188115, dated Jul. 4, 2000, along with machine translation in English.

U.S. Office action dated Apr. 16, 2009, for parent U.S. Appl. No. 11/137,136.

U.S. Office action dated Nov. 25, 2009, for parent U.S. Appl. No. 11/137,136.

U.S. Office action dated May 11, 2010, for related U.S. Appl. No. 11/137,136.

U.S. Office action dated Oct. 21, 2010, for cross reference U.S. Appl. No. 11/137,136, 12 pages.

U.S. Office action dated Apr. 25, 2011, for cross reference U.S. Appl. No. 11/137,136, 10 pages.

U.S. Office action dated Sep. 20, 2011, for cross reference U.S. Appl. No. 11/137,136, 12 pages.

U.S. Office action dated Jun. 6, 2012, for U.S.cross reference U.S. Appl. No. 12/633,738, (18 pages).

* cited by examiner

FIG.1

PRIOR ART

FIG.2

PRIOR ART

SECONDARY BATTERY

CROSS REFERENCE TO RELATED APPLICATION

This application is a continuation of U.S. patent application Ser. No. 11/137,136, filed May 24, 2005, which claims priority to and the benefit of Korean Patent Application number 2004-0037501, filed May 25, 2004 in the Korean Intellectual Property Office, the entire content of which is incorporated herein by reference.

FIELD OF THE INVENTION

The present invention relates to secondary batteries using lithium ions, and more particularly to secondary batteries having adiabatic plates attached to a surface of the negative electrode plate. The adiabatic plate is fixed to the surface opposite the surface to which the negative electrode tab is fixed. This construction prevents an additional short circuit between the negative electrode plate and the negative electrode tab when an internal short circuit occurs. This construction also prevents an additional short circuit when the separator melts due to heat generated from the electrode tab during overcharging or over-discharging of the battery.

BACKGROUND OF THE INVENTION

As is generally known in the art, secondary batteries are batteries that can be charged and discharged, unlike primary batteries which cannot be charged. Secondary batteries are widely used in cutting-edge electronic appliances, including cellular phones, laptop computers, and camcorders.

Lithium secondary batteries are examples of such secondary batteries and have operation voltages of about 3.7 V. These operation voltages are about three times greater than those of nickel-cadmium batteries or nickel-hydrogen batteries which are often used as power sources for many portable electronic appliances. Lithium secondary batteries also have high energy density per unit weight. For these reasons, lithium secondary batteries have been widely used.

Lithium secondary batteries generally use lithium-based oxides as the positive active materials, and use carbon materials as the negative active materials. Lithium secondary batteries are classified into liquid electrolyte batteries and polymer electrolyte batteries depending on the type of electrolyte used. Liquid electrolyte batteries are referred to as lithium ion batteries and polymer electrolyte batteries are referred to as lithium polymer batteries.

Figure 1:
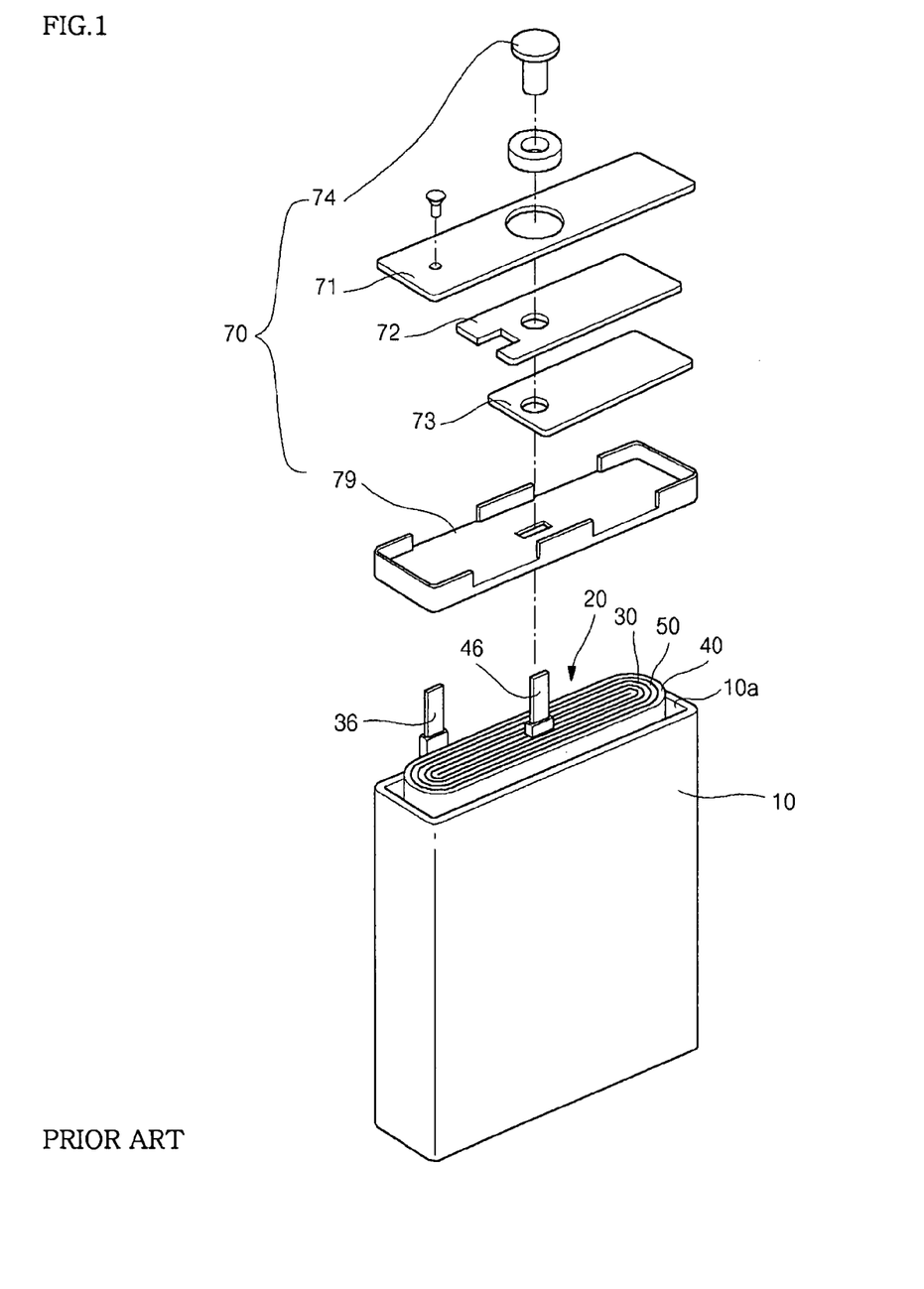
FIG. 1 is an exploded perspective view of a secondary battery according to the prior art.
Figure 2:
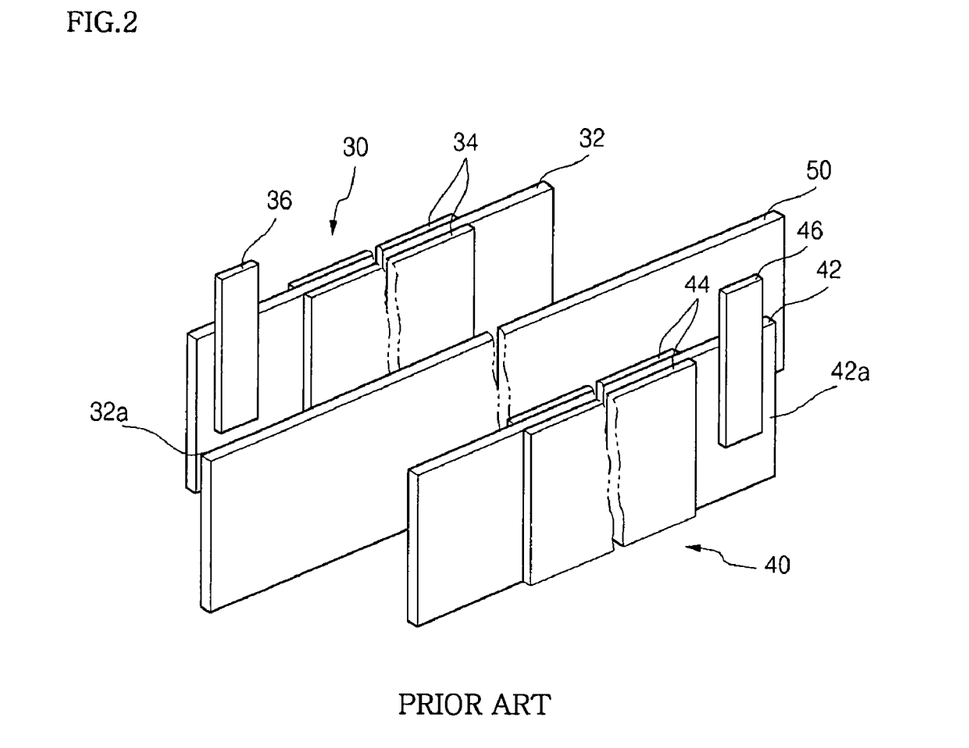
FIG. 2 is a perspective view of an unwound electrode assembly according to the prior art.

There are various types of lithium secondary batteries, including cylinders, cans, and pouches. As shown in FIGS. 1 and 2, a typical can-type lithium ion secondary battery includes a can 10, an electrode assembly 20 contained in the can 10, and a cap assembly 70 for sealing the top opening of the can 10. The can 10 may comprise a metallic member having the shape of a cuboid, and the can itself can be a terminal. The can 10 has an open top surface 10a, and the electrode assembly 20 is placed in the can 10 through the open top surface 10a.

The electrode assembly 20 includes a positive electrode plate 30, a negative electrode plate 40, and a separator 50. The separator 50 is positioned between the positive and negative electrode plates 30 and 40, respectively, and the entire assembly is then wound, creating a jelly roll construction.

The positive electrode plate 30 includes a positive electrode collector 32 comprising thin aluminum foil and a positive electrode coating 34 comprising a lithium-based oxide as the main component. The positive electrode coating 34 is coated on both surfaces of the positive electrode collector 32. The positive electrode collector 32 also has non-coated areas 32a, which are not coated with the positive electrode coating 34. The non-coated areas 32a are located on both ends of the positive electrode plate 30. A positive electrode tab 36 is fixed to one of the non-coated areas 32a by ultrasonic welding such that both ends of the positive electrode tab 36 protrude from the upper end of the positive electrode collector 32. The positive electrode tab 36 usually comprises nickel or nickel alloy, but other metals may also be used.

The negative electrode plate 40 includes a negative electrode collector 42 comprising thin copper foil and a negative electrode coating 44 comprising a carbon material as the main component. The negative electrode coating 44 is coated on both surfaces of the negative electrode collector 42. The negative electrode collector 42 also has non-coated areas 42a, which are not coated with the negative electrode coating 44. The non-coated areas 42a are located on both ends of the negative electrode plate. A negative electrode tab 46 is fixed to one of the non-coated areas 42a by ultrasonic welding such that both ends of the tab 46 protrude from the upper end of the negative electrode collector 42. The negative electrode tab 46 usually comprises nickel or nickel alloy, but other metals may also be used.

The separator 50 is positioned between the positive and negative electrode plates 30 and 40, respectively, thereby insulating the electrode plates from each other. The separator 50 comprises polyethylene, polypropylene, or a composite film of polyethylene and polypropylene. The separator 50 usually has a width larger than the widths of the positive and negative electrode plates 30 and 40, respectively, to prevent a short circuit between the electrode plates.

The cap assembly 70 includes a cap plate 71, an insulation plate 72, a terminal plate 23, and a negative electrode terminal 74. The cap assembly 70 is first coupled to a separate insulation case 79, and is then coupled to the open top surface 10a of the can 10, thereby sealing the can.

Heat is generated in the can either when the battery is overcharged or overdischarged, or when a short circuit occurs between the electrodes. In particular, the heat concentrates on the part of the can having increased internal resistance, i.e. where different metals are bonded together to weld the electrode plate to the electrode tab. As heat concentrates around the electrode tab, the separator, which insulates the positive and negative electrode plates from each other, melts and contracts. As a result, an additional short circuit occurs between the electrode plates.

Secondary batteries tend to have larger capacity, thereby increasing the energy density of such batteries. The heat generated at the electrode tabs of these batteries due to initial heating causes short circuits between the electrode plates. As a result, overheating and explosion of these secondary batteries is more frequent.

SUMMARY OF THE INVENTION

The present invention is directed to a secondary battery having an adiabatic plate attached to a surface of the negative electrode plate. This adiabatic plate is attached to the surface opposite the surface to which the negative electrode tab is fixed. This construction prevents an additional short circuit between the negative electrode plate and the negative electrode tab when an internal short circuit occurs. This construction also prevents an additional short circuit when the separator melts due to heat generated from the electrode tab during overcharging or overdischarging of the battery.

In one embodiment, the secondary battery of the present invention comprises an electrode assembly formed by winding a positive electrode plate, a negative electrode plate and a separator. The positive electrode plate comprises a positive electrode collector, a positive electrode coating coated on a portion of the positive electrode collector and at least one non-coated area on the positive electrode collector. The negative electrode plate comprises a negative electrode collector, a negative electrode coating coated on the negative electrode collector and at least one non-coated area on the negative electrode collector. The separator insulates the positive and negative electrode plates from each other. The electrode assembly further comprises positive and negative electrode tabs fixed to the non-coated areas of the positive and negative electrode plates, respectively. The negative electrode adiabatic plate is attached to a surface of the non-coated area of the negative electrode collector, and is positioned on the surface of the collector opposite the surface on which the negative electrode tab is fixed.

The negative electrode adiabatic plate may comprise an organic material selected from the group consisting of polyimide (PI), polyethylene terephthalate (PET), and polypropylene (PP). Alternatively, the negative electrode adiabatic plate may comprise a composite material including an organic material and an inorganic material. In this embodiment, the organic material of the negative electrode adiabatic plate may comprise a material selected from the group consisting of PI, PET, and PP. The inorganic material may comprise a material selected from the group consisting of oxides and nitrides. The oxides may be selected from the group consisting of $Al_2O_3$, $TiO_2$, $ZrO_2$, $SiO_2$, $MnO_2$, MgO, and mixtures thereof. The nitrides may be selected from the group consisting of $Si_3N_4$, BN, and mixtures thereof.

The shape of the particles of the inorganic material of the negative electrode adiabatic plate is selected from the group consisting of whiskers, balls and plates. The diameters of the whiskers or balls, and the thicknesses of the plates, are preferably less than 50% of the thickness of the adiabatic plate. The adiabatic plate preferably has a thickness of from about 5 to about 200 μm. The inorganic material comprises from about 20 to about 80 wt % of the adiabatic plate.

The positive electrode plate may also have an adiabatic plate attached to a surface of the non-coated area of the positive electrode collector. This positive electrode adiabatic plate is attached to the surface of the positive electrode plate opposite the surface to which the positive electrode tab is fixed. The positive electrode adiabatic plate may have the same composition as the negative electrode adiabatic plate. However, the positive electrode adiabatic plate has a thickness less than that of the negative electrode adiabatic plate.

Insulation plates may be attached to the negative and positive electrode tabs. These insulation plates may have the same composition as the negative electrode adiabatic plate.

The positive electrode tab may be positioned on the outer periphery of the electrode assembly. The negative electrode tab may be positioned on the inner periphery of the electrode assembly. Alternatively, the positive and negative electrode tabs may both be positioned on the inner periphery of the electrode assembly and separated from each other by a predetermined distance.

BRIEF DESCRIPTION OF THE DRAWINGS

The above and other features and advantages of the present invention will become more apparent by reference to the following detailed description when taken in conjunction with the accompanying drawings, in which.

DETAILED DESCRIPTION

Exemplary embodiments of the present invention will now be described with reference to the accompanying drawings. In the following description and accompanying drawings, like reference numerals are used to designate like components in order to omit repetitive descriptions of same or similar components.

Figure 3:
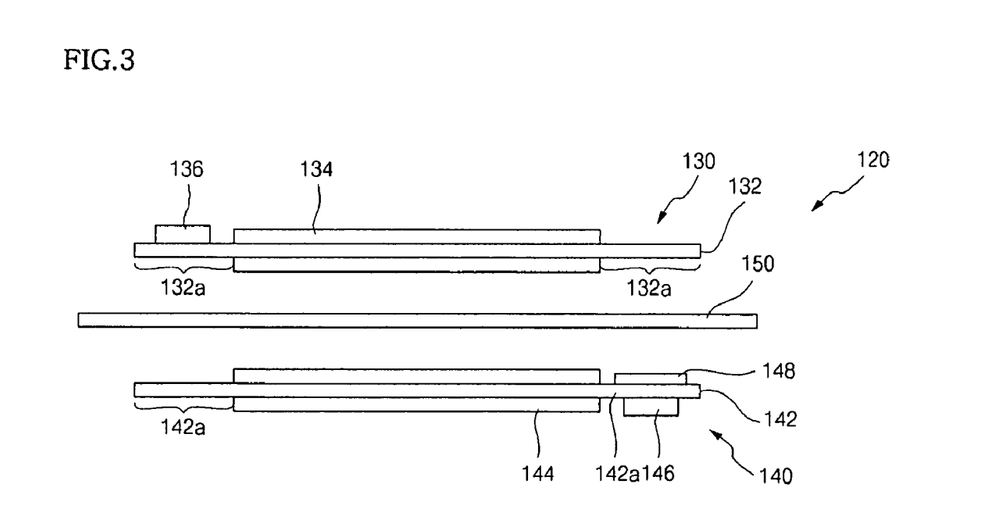
FIG. 3 is a top view of an unwound electrode assembly according to one embodiment of the present invention.
Figure 4:
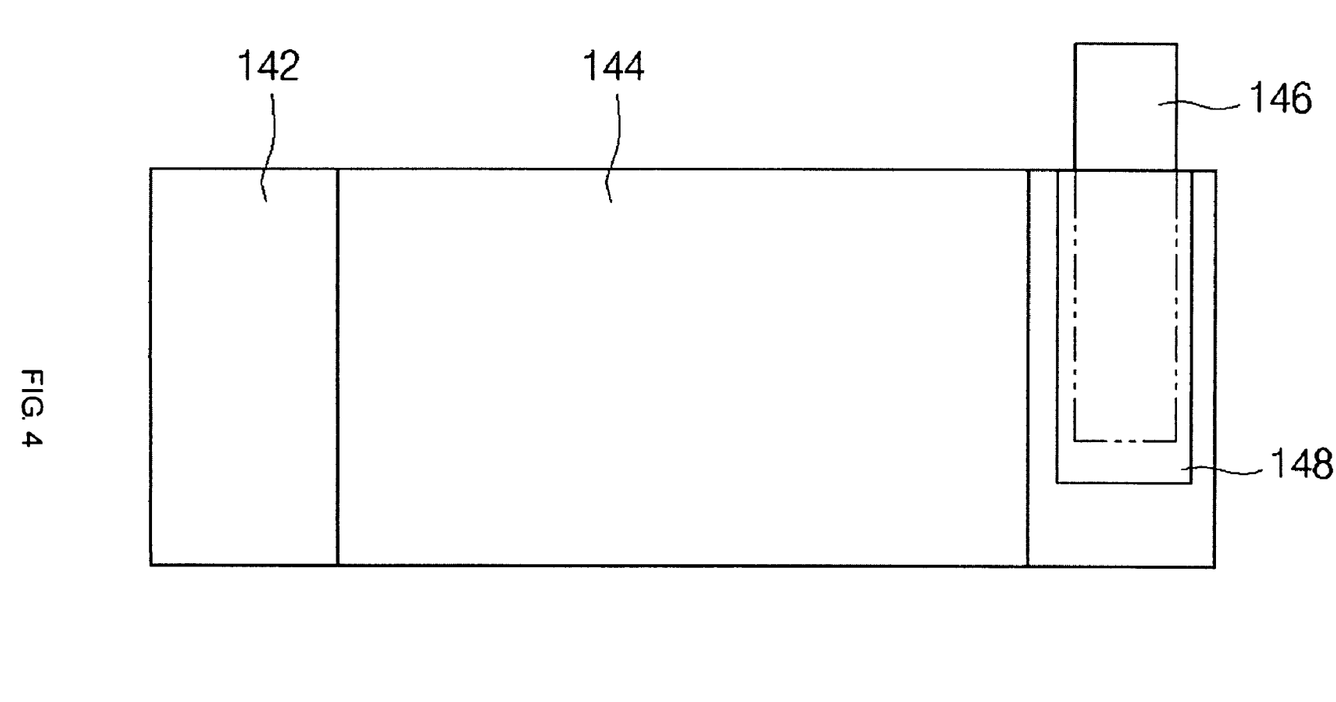
FIG. 4 is a front view of an electrode plate of the electrode assembly of FIG. 3.
Figure 5:
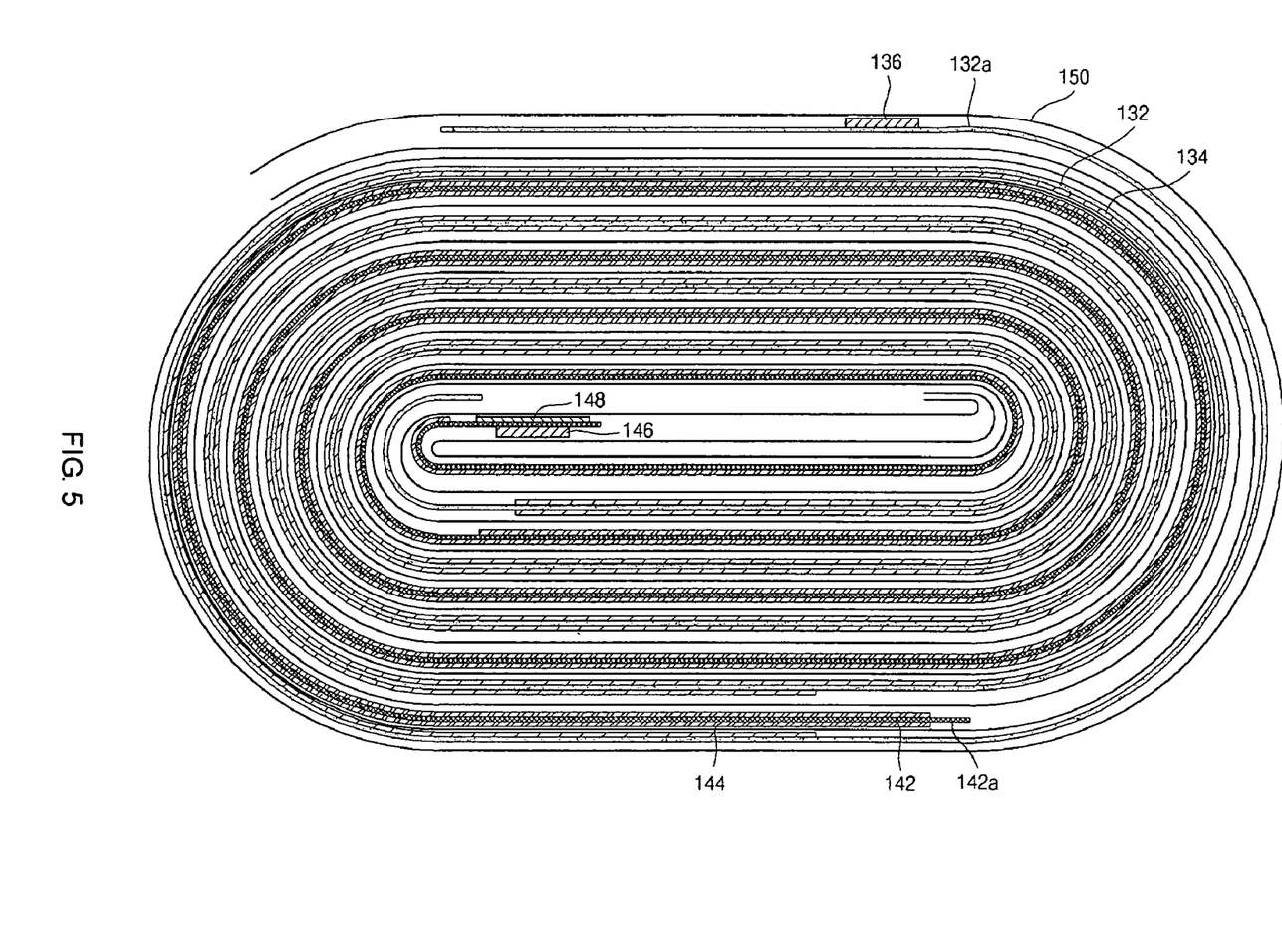
FIG. 5 is a top view of the electrode assembly of FIG. 3 after winding.
Figure 6:
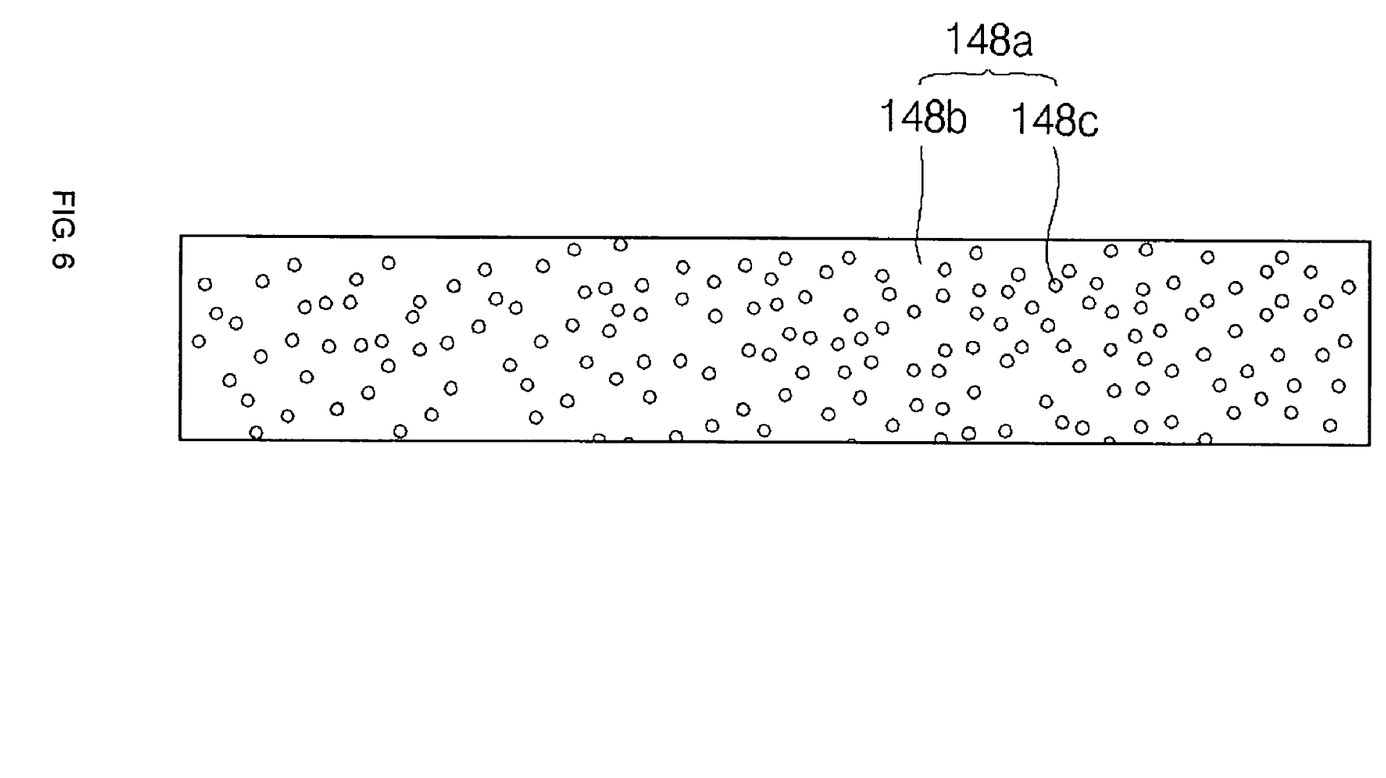
FIG. 6 is a sectional view of an adiabatic plate according to an alternative embodiment of the present invention.
Figure 7:
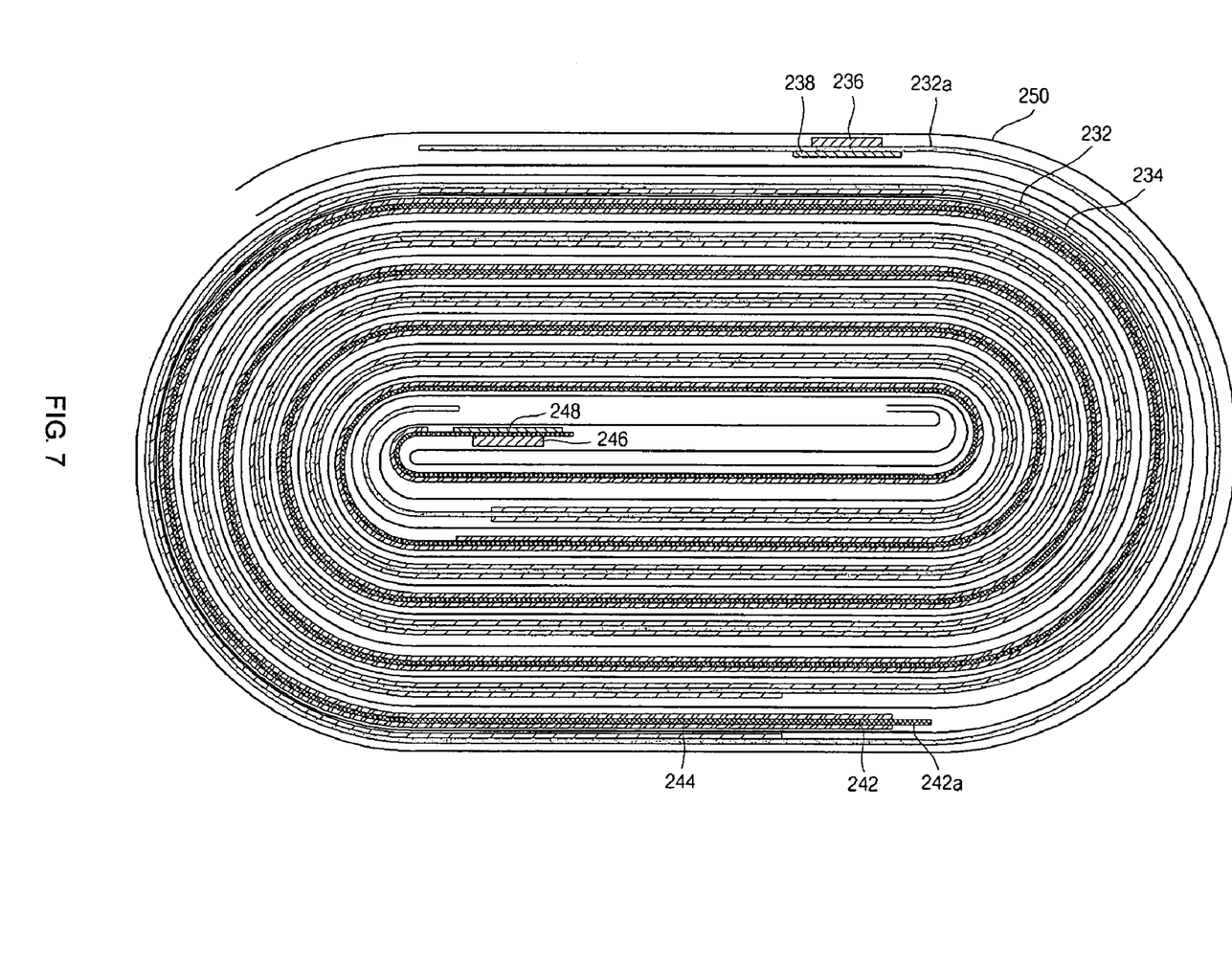
FIG. 7 is a top view of a wound electrode assembly according to another alternative embodiment of the present invention.
Figure 8:
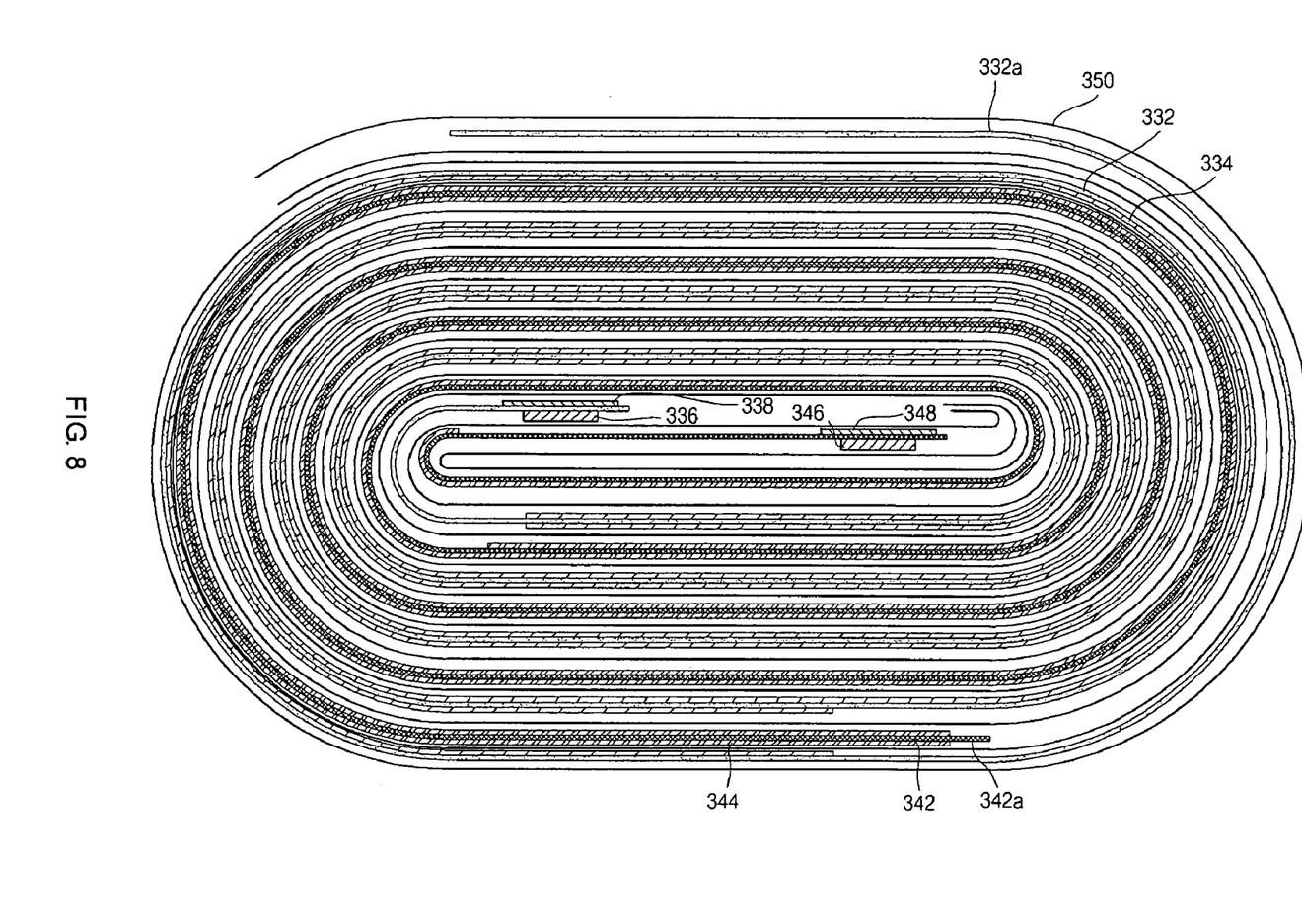
FIG. 8 is a top view of a wound electrode assembly according to yet another alternative embodiment of the present invention.
Figure 9:
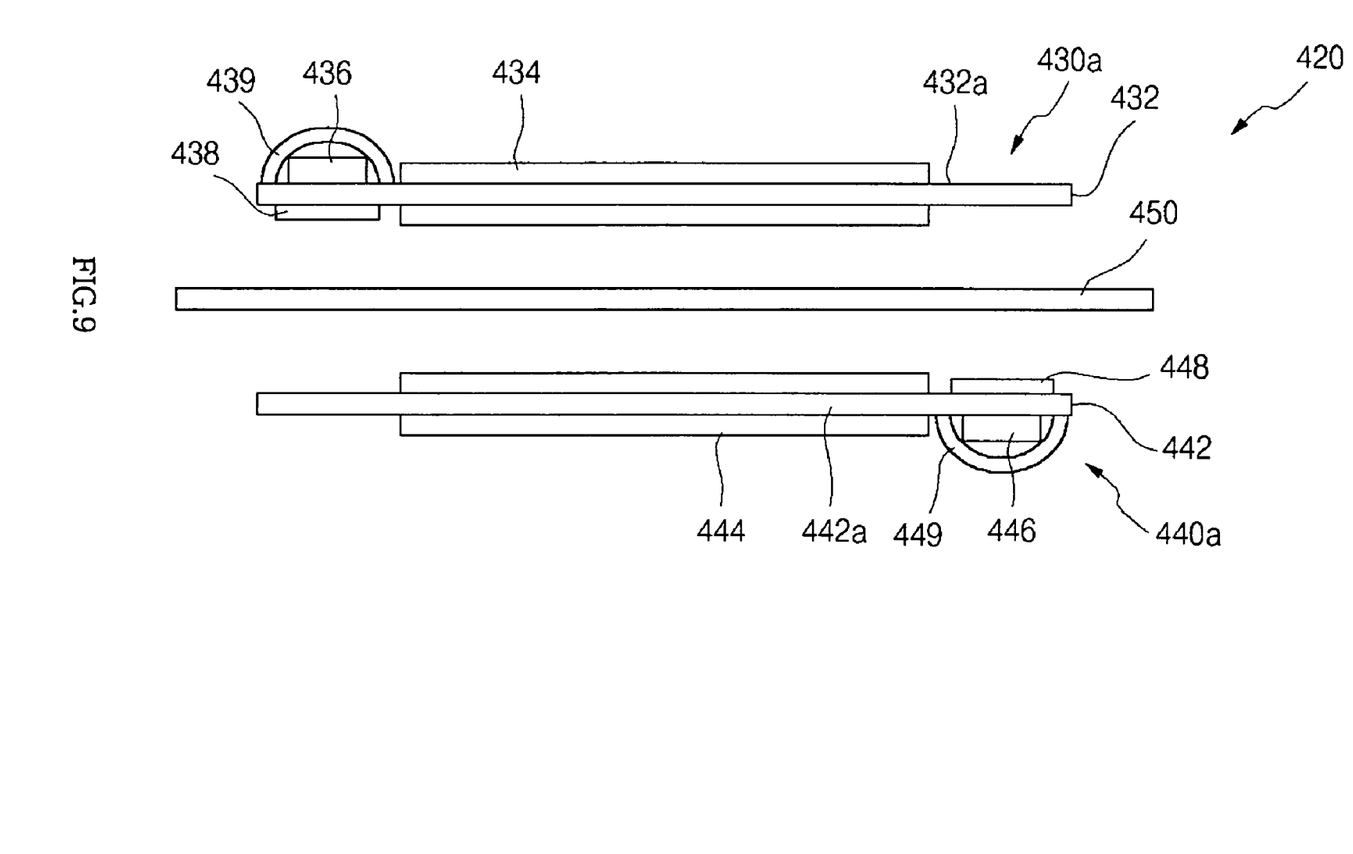
FIG. 9 is a top view of an unwound electrode assembly according to still another alternative embodiment of the present invention.

FIG. 3 is a top view of an unwound electrode assembly according to one embodiment of the present invention. FIG. 4 is a front view of an electrode plate of the electrode assembly of FIG. 3. FIG. 5 is a top view of the electrode assembly of FIG. 3 after winding. FIG. 6 is a sectional view of an adiabatic plate according to an alternative embodiment of the present invention. FIG. 7 is a top view of an unwound electrode assembly according to another alternative embodiment of the present invention. FIG. 8 is a top view of a wound electrode assembly according to yet another alternative embodiment of the present invention. FIG. 9 is a top view of an unwound electrode assembly according to still another alternative embodiment of the present invention.

Figure 3A:
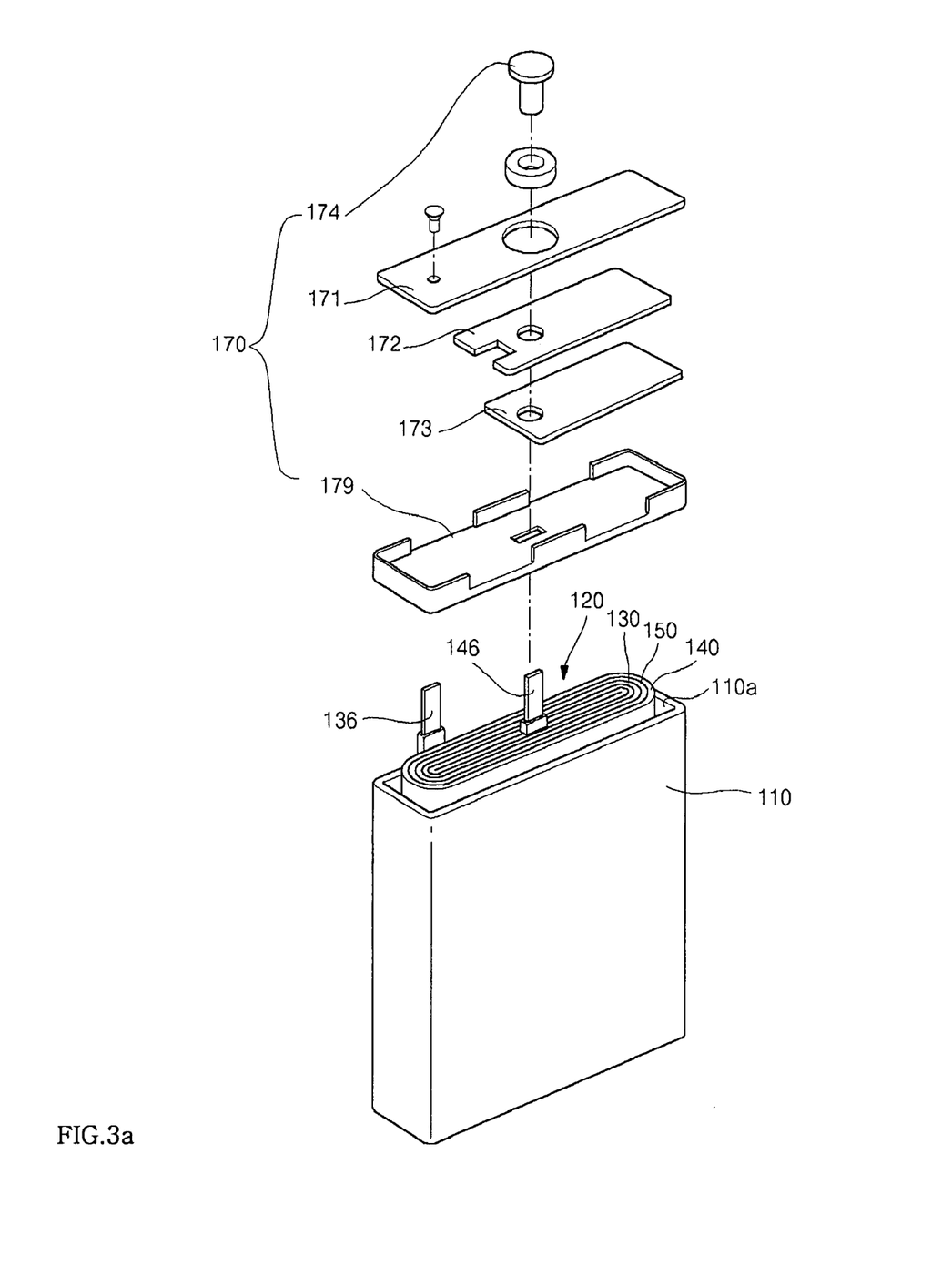
FIG. 3a is an exploded perspective view of a secondary battery according to one embodiment of the present invention.

In one embodiment of the present invention, as shown in FIG. 3a, a lithium ion secondary battery comprises a can 110, an electrode assembly 120 contained in the can 110, and a cap assembly 170 for sealing the can 110. The can 110 may comprise a metallic member having the shape of a cuboid, and the can itself can be a terminal. The can 110 has an open top surface 110a, and the electrode assembly 120 is placed in the can 110 through the open top surface 110a.

The cap assembly 170 includes a cap plate 171, an insulation plate 172, a terminal plate 173, and a negative electrode terminal 174. The cap assembly 170 is coupled to a separate insulation case 170, and is then coupled to the open top surface 110a of the can 110, thereby sealing the can 110.

Referring to FIGS. 3, 4 and 5, the electrode assembly 120 includes a positive electrode plate 130, a negative electrode plate 140, and a separator 150. The separator 150 is positioned between the positive and negative electrode plates 130 and 140, respectively, and the construction is then wound into a jelly roll construction.

The electrode assembly 120 has a negative electrode tab 146 positioned on its inner periphery. The negative electrode tab 146 is welded to the negative electrode plate 140 and protrudes from the top of the electrode assembly 120, as shown in FIG. 3a. The electrode assembly also has a positive electrode tab 136 positioned on its outer periphery. The positive electrode tab 136 is welded to the positive electrode plate 130 and protrudes from the top of the electrode assembly 120, as also shown in FIG. 3a. As used herein, the "inner periphery" is the end of the electrode assembly, which, after winding, is positioned in the center of the wound electrode assembly 120, as shown in FIG. 3a. The "outer periphery" is the end of the electrode assembly, which, after winding, is positioned on the outer edge of the wound electrode assembly, as also shown in FIG. 3a.

The positive electrode plate 130 comprises a positive electrode collector 132, a positive electrode coating 134 coated on a portion of the positive electrode collector 132, and a positive electrode tab 136. The positive electrode collector 132 comprises thin aluminum foil. The positive electrode coating 134 comprises a lithium-based oxide as its main component and is coated on both surfaces of the positive electrode collector 132. The positive electrode collector 132 also comprises non-coated areas 132a, which are not coated with the positive electrode coating 134. These non-coated areas 132a are located on both ends of the positive electrode collector 132.

The positive electrode tab 136 is fixed to a first surface of one of the non-coated areas 132a of the positive electrode collector 132 by ultrasonic welding or laser welding. The positive electrode tab 136 preferably comprises nickel and is positioned such that its upper end protrudes from the upper end of the positive electrode collector 132.

The negative electrode plate 140 comprises a negative electrode collector 142, a negative electrode coating 144 coated on a portion of the negative electrode collector 142, a negative electrode tab 146, and a negative electrode adiabatic plate 148. The negative electrode collector 142 comprises thin copper foil. The negative electrode coating 144 comprises a carbon material as its main component and is formed on both surfaces of the negative electrode collector 142. The negative electrode collector 142 also comprises non-coated areas 142a, which are not coated with the negative electrode coating 144. These non-coated areas are located on both ends of the negative electrode collector 142.

The negative electrode tab 146 preferably comprises nickel and is fixed to a first surface of one of the non-coated areas 142a of the negative electrode collector 142. The negative electrode tab 146 is positioned on the inner periphery of the electrode assembly 120 by ultrasonic welding. The negative electrode tab 146 is positioned such that its upper end protrudes from the upper end of the negative electrode collector 142.

The negative electrode adiabatic plate 148 comprises an adhesive tape comprising an adiabatic material having excellent heat-interruption performance. Nonlimiting examples of suitable adiabatic materials include polyimide (PI), polyethylene terephthalate (PET), and polypropylene (PP). The negative electrode adiabatic plate 148 preferably has a thickness of from about 5 to about 200 µm. If the negative electrode adiabatic plate 148 is too thin, i.e. if its thickness is less than about 5 µm, its heat-interruption performance declines. If the negative electrode adiabatic plate is too thick, i.e. if its thickness is greater than about 200 µm, the thickness of the jelly roll construction partially increases.

The negative electrode adiabatic plate 148 is attached to a second surface of a non-coated area 142a of the negative electrode collector 142, and the second surface is opposite the first surface, to which the negative electrode tab 146 is welded. The area of attachment of the negative electrode adiabatic plate 148 is preferably larger than that of the negative electrode tab 146. As illustrated in FIG. 4, the negative electrode adiabatic plate 148 extends beyond at least two opposite edges of the negative electrode tab 146.

As shown in FIG. 5, the separator 150 is positioned between the positive and negative electrode plates 130 and 140, respectively, insulating the electrode plates from each other. The electrode assembly 120 is then wound such that the positive and negative electrode tabs 136 and 146, respectively, are positioned on the outer and inner peripheries, respectively, of the wound electrode assembly 120. The negative electrode adiabatic plate 148 is positioned on a second surface of a non-coated area 142a of the negative electrode collector 142, and the second surface is opposite the first surface, to which the negative electrode tab 146 is welded. This construction enables interruption of the heat generated by the negative electrode tab 146, thereby preventing transmission of that heat to the separator 150 and the positive electrode plate 130.

In general, the sites in the electrode assembly 120 where the electrode plates and the electrode tabs are welded together generate large amounts of heat. In particular, the site in the electrode assembly where the negative electrode plate 140 and the negative electrode tab 146 are welded together generates the largest amount of heat. The separate negative electrode adiabatic plate 148 of the present invention, however, prevents the heat generated from the negative electrode tab 146 from being transmitted to the separator 150 and positive electrode plate 130. As a result, the separator 150 does not contract, thereby preventing a short circuit between the positive and negative electrode plates 130 and 140, respectively.

FIG. 6 is a sectional view of an adiabatic plate according to an alternative embodiment of the present invention. FIG. 6 depicts a negative electrode adiabatic plate 148a comprising a composite material having excellent heat-interruption performance, thermal resistance, and endurance. More particularly, the negative electrode adiabatic plate 148a comprises a composite material including particles of an organic material 148b having a low melting point and particles of an inorganic material 148c having a high melting point. The inorganic material 148c maintains the adiabatic and insulative properties of the plate 148a even when the temperature of the negative electrode adiabatic plate 148a increases and the organic material 148b melts.

The negative electrode adiabatic plate 148a comprises an adhesive tape and preferably has a thickness of from about 5 to about 200 µm. If the negative electrode adiabatic plate 148a is too thin, i.e. if its thickness is smaller than about 5 µm, the heat-interruption performance declines. If the negative electrode adiabatic plate 148a is too thick, i.e. if its thickness is greater than about 200 µm, the thickness of the electrode assembly partially increases.

The negative electrode adiabatic plate 148a contacts the electrolyte inside the can 110 and thus must have strong resistance to the electrolyte. Accordingly, the organic material 148b of the negative electrode adiabatic plate 148a comprises a material having excellent resistance to the electrolyte of the secondary battery. Nonlimiting examples of suitable materials for use as the organic material 148b include polyimide (PI), polyethylene terephthalate (PET), and polypropylene (PP).

The inorganic material 148c of the negative electrode adiabatic plate 148a comprises a non-conductive material having a high melting point. Nonlimiting examples of suitable materials for use as the inorganic material 148a include oxides and nitrides. Nonlimiting examples of suitable oxides include $Al_2O_3$, $TiO_2$, $ZrO_2$, $SiO_2$, $MnO_2$, MgO and mixtures thereof. Nonlimiting examples of suitable nitrides include $Si_3N_4$, BN and mixtures thereof.

The particles of the inorganic material 148c may take various shapes, including balls, whiskers, and plates. The ball-shaped or whisker-shaped particles preferably have diameters less than about 50% of the thickness of the negative electrode adiabatic plate 148a. More preferably, the diameters of the ball-shaped or whisker-shaped particles are less than about 10% of the thickness of the negative electrode adiabatic plate 148a. Similarly, the thicknesses of the plate-shaped particles are less than about 50% of the thickness of the negative electrode adiabatic plate 148a. More preferably, the thicknesses of the plate-shaped particles are less than about 10% of the thickness of the negative electrode adiabatic plate 148a. If the diameters of the ball-shaped or whisker-shaped particles, or the thicknesses of the plate-shaped particles of the inorganic material 148c are larger than about 50% of the thickness of the negative electrode adiabatic plate 148a, the surface of the negative electrode adiabatic plate 148a is not smooth and the adhesive force of the plate 148a decreases.

In this embodiment, the weight of the inorganic material 148c ranges from about 20 to about 80% of the total weight of the negative electrode adiabatic plate 148a. If the inorganic material 148c comprises less than about 20% of the total weight of the negative electrode adiabatic plate 148a, it becomes difficult for the inorganic material 148c to maintain the integrity of the negative electrode adiabatic plate 148a when the organic material 148a melts. Therefore, if less than about 20 wt % of the inorganic material is used, there is little advantage to use of the composite material for the negative electrode adiabatic plate 148a. If the inorganic material 148c comprises more than about 80% of the total weight of the negative electrode adiabatic plate 148a, it becomes difficult to shape the composite material into an adhesive tape. In addition, the strength of the negative electrode adiabatic plate 148a decreases. This causes problems during battery operation.

The negative electrode adiabatic plate 148a is attached to a second surface of a non-coated area 142a of the negative electrode collector 142, and the second surface is opposite the first surface, to which the negative electrode tab 146 is welded. The area of attachment of the negative electrode adiabatic plate 148a is preferably larger than that of the negative electrode tab 146.

FIG. 7 is a top view showing an electrode assembly according to another alternative embodiment of the present invention. FIG. 7 depicts an electrode assembly 220 comprising a positive electrode adiabatic plate 238, a positive electrode tab 236 and a negative electrode tab 246. Specifically, the positive electrode adiabatic plate 238 is attached to a second surface of a non-coated area 232a of the positive electrode current collector 232, and the second surface is opposite the first surface, to which the positive electrode tab 236 is welded.

The positive electrode tab 236 is generally positioned on the outer periphery of the electrode assembly 220 such that the generated heat diffuses toward the can. When heat is rapidly generated, however, it may be transmitted to the inner periphery of the electrode assembly 220. The positive electrode adiabatic plate 238 may have a thickness less than that of the negative electrode adiabatic plate 248 as long as the positive electrode tab 236 is positioned on the outer periphery of the electrode assembly 220. This construction enables the generated heat to easily diffuse to the exterior of the electrode assembly because less heat is generated near the negative electrode tab 246.

FIG. 8 is a top view showing an electrode assembly according to yet another alternative embodiment of the present invention. The electrode assembly 320 has positive and negative electrode tabs 336 and 346, respectively, both positioned on the inner periphery of the electrode assembly 320 and spaced apart from each other by a predetermined distance. The electrode assembly 320 further comprises a positive electrode adiabatic plate 338 and a negative electrode adiabatic plate 348. The positive electrode adiabatic plate 338 is attached to a second surface of a non-coated area 132a of the positive electrode current collector 332, and the second surface is opposite the first surface, to which the positive electrode tab 338 is attached. Similarly, the negative electrode adiabatic plate 348 is attached to a second surface of a non-coated area 142a of the negative electrode current collector 342, and the second surface is opposite the first surface, to which the negative electrode tab 348 is attached. By this construction, the heat generated from the positive and negative electrode tabs 336 and 346, respectively, during charging or discharging of the secondary battery is not transmitted to the separator 150 or electrode plate. Therefore, the separator 150 neither melts nor contracts.

FIG. 9 is a top view of an unwound electrode assembly according to still another alternative embodiment of the present invention. As shown in FIG. 9, the electrode assembly 420 includes a positive electrode insulation plate 439 formed on the positive electrode tab 436, and a negative electrode insulation plate 449 formed on the negative electrode tab 446. The electrode assembly 420 further comprises a positive electrode adiabatic plate 438 and a negative electrode adiabatic plate 448. The positive electrode adiabatic plate 438 is attached to a second surface of a non-coated area 432a of the positive electrode current collector 432, and the second surface is opposite the first surface, to which the positive electrode insulation plate 439 is attached. Similarly, the negative electrode adiabatic plate 448 is attached to a second surface of a non-coated area 442a of the negative electrode current collector 442, and the second surface is opposite the first surface, to which the negative electrode insulation plate 449 is attached. As illustrated in FIG. 9, the positive electrode adiabatic plate 438 extends beyond at least two opposite edges of the positive electrode tab 436, and the negative electrode adiabatic plate 448 extends beyond at least two opposite edges of the negative electrode tab 446.

The positive and negative electrode tabs 436 and 446, respectively, are generally formed by cutting a metal plate having a predetermined shape by press molding. This process may create a burr on one corner of each plate. However, if the positive and negative electrode tabs 436 and 446, respectively, each comprise a burr, the burrs may extend through the separator 450 when the electrode assembly is wound. The separator 450, which electrically insulates the positive and negative electrode plates 430 and 440, respectively, may then be damaged and a short circuit may occur between the positive and negative electrode plates 130 and 140, respectively. Therefore, the insulation plates 439 and 449 are applied over the positive and negative electrode tabs 436 and 446, respectively. This prevents the separator 150 from being damaged by the burrs on the positive and negative electrode tabs 436 and 446, respectively, and prevents a short circuit from occurring between the electrode plates.

The insulation plates 139 and 149 can be applied over the positive and negative electrode tabs 436 and 446, respectively, by attaching the insulation plates 139 and 149 to the surface of the non-coated area 132a or 142a to which the positive electrode tab 436 or negative electrode tab 446 is attached, as shown in FIG. 9. This construction prevents the positive and negative electrode tabs 436 and 446, respectively, from contacting the separator 450 either directly or indirectly, thereby preventing any damage to the separator 450.

The insulation plates 439 and 449 can comprise the same material as the adiabatic plates 438 and 448. When the insulation plates 439 and 449 comprise the same material as the adiabatic plates 438 and 448, both adiabatic and insulative properties are obtained, thereby preventing the separator from melting and contracting.

The present invention has been described with reference to a can-type secondary battery having an electrode assembly with a jelly roll construction that is uniformly compressed. However, the present invention is not limited to can-type secondary batteries, but rather can be applied to any secondary batteries using electrode assemblies having jelly roll constructions. As such, the present invention can be applied not only to square-type secondary batteries, but also to cylinder-type secondary batteries, button-type secondary batteries, and primary batteries.

The present invention prevents melting and contraction of the separator due to heat generated from the electrode tab during overcharging or overdischarging of the battery. In addition, the present invention prevents melting and contracting of the separator when an internal short circuit occurs. By preventing the melting and contraction of the separator, the present invention also prevents an additional short circuit from occurring between the electrode tabs and the electrode plates, and particularly between the negative electrode tab and the negative electrode plate.

Presently preferred embodiments of the present invention have been described for illustrative purposes only. Those skilled in the art will appreciate that various modifications, additions and substitutions may be made without departing from the spirit and scope of the invention as described in the accompanying claims.

What is claimed is:

1. An electrode assembly for a secondary battery, the electrode assembly comprising:
   a positive electrode layer comprising a positive electrode collector and a positive electrode coating on a portion of the positive electrode collector, the positive electrode collector having at least one uncoated portion having a first dimension between an end of the positive electrode collector and an end of the positive electrode coating and a second dimension having first and second ends extending generally perpendicular to the first dimension;
   a negative electrode layer comprising a negative electrode collector and a negative electrode coating on a portion of the negative electrode collector, the negative electrode collector having at least one uncoated portion having a first dimension between an end of the negative electrode collector and an end of the negative electrode coating and a second dimension having first and second ends extending generally perpendicular to the first dimension;
   a separator between the positive electrode layer and the negative electrode layer;
   a positive electrode tab at a first side of the uncoated portion of the positive electrode collector and electrically coupled to the positive electrode collector;
   a negative electrode tab at a first side of the uncoated portion of the negative electrode collector and electrically coupled to the negative electrode collector; and
   an adiabatic layer on at least one of the positive electrode collector or the negative electrode collector, the adiabatic layer having a first dimension along the first dimension of the respective positive electrode collector or negative electrode collector and a second dimension having first and second ends extending along the first and second ends of the second dimension of the respective positive electrode collector or negative electrode collector, wherein the adiabatic layer is at a second side of the uncoated portion of the positive or negative electrode collector opposite the first side,
   wherein the adiabatic layer covers more area on the uncoated portion of the positive or negative electrode collector than respective said positive or negative electrode tab, wherein the adiabatic layer extends beyond at least two opposite edges of the respective said positive or negative electrode tab, wherein a width along the first and second ends of the second dimension of the adiabatic layer is smaller than a width along the first and second ends of the second dimension of the uncoated portion of the electrode collector, wherein the adiabatic layer is positioned on the electrode collector without contacting the respective said positive or negative electrode coating, and wherein one of the first or second ends of the second dimension of the adiabatic layer is at one of the first or second ends of the second dimension of the uncoated portion of the positive or negative electrode collector.

2. The electrode assembly of claim 1, wherein the adiabatic layer is on the positive electrode collector or the negative electrode collector.

3. The electrode assembly of claim 1, wherein the adiabatic layer comprises a positive electrode adiabatic layer on the positive electrode collector and a negative electrode adiabatic layer on the negative electrode collector.

4. The electrode assembly of claim 1, wherein the positive electrode tab is located near an outer periphery of the electrode assembly and the negative electrode tab is located near an inner periphery of the electrode assembly.

5. The electrode assembly of claim 1, wherein both the negative electrode tab and the positive electrode tab are located near an inner periphery of the electrode assembly.

6. The electrode assembly of claim 1, wherein the adiabatic layer comprises an organic material selected from the group consisting of polyimide (PI), polyethylene terephthalate (PET), and polypropylene (PP).

7. The electrode assembly of claim 1, wherein the adiabatic layer comprises a composite material comprising an organic material and an inorganic material.

8. The electrode assembly of claim 7, wherein the inorganic material of the adiabatic layer is selected from the group consisting of oxides and nitrides.

9. The electrode assembly of claim 8, wherein the inorganic material is selected from the group consisting of $Al_2O_3$, $TiO_2$, $ZrO_2$, $SiO_2$, $MnO_2$, $MgO$, $Si_3N_4$, $BN$ and mixtures thereof.

10. The electrode assembly of claim 7, wherein the inorganic material comprises particles having a shape selected from the group consisting of whiskers, balls and plates.

11. The electrode assembly of claim 10, wherein the particles of the inorganic material have thicknesses less than 50% of a thickness of the adiabatic layer.

12. The electrode assembly of claim 7, wherein the inorganic material comprises about 20 to about 80 wt % of the adiabatic layer.

13. The electrode assembly of claim 1, wherein the adiabatic layer has a thickness of from about 5 to about 200 μm.

14. The electrode assembly of claim 3, wherein the positive electrode adiabatic layer has a thickness less than a thickness of the negative electrode adiabatic layer.

15. The electrode assembly of claim 1, further comprising an insulation layer attached to at least one of the positive electrode tab or the negative electrode tab.

16. The electrode assembly of claim 15, wherein the insulation layer comprises substantially a same material as the adiabatic layer.

17. The electrode assembly of claim 1, wherein the positive electrode tab is welded to the positive electrode collector and the negative electrode tab is welded to the negative electrode collector, wherein the adiabatic layer covers welding locations of the respective said positive or negative electrode tab.

18. The electrode assembly of claim 1, wherein the positive electrode tab is located near an inner periphery of the electrode assembly and the negative electrode tab is located near an outer periphery of the electrode assembly.

* * * * *